United States Patent [19]

Suzuki

[11] 4,336,563
[45] Jun. 22, 1982

[54] OVERCURRENT PROTECTION CIRCUIT FOR INVERTER

[75] Inventor: Masakazu Suzuki, Kyoto, Japan

[73] Assignee: Kabushiki Kaisha Morita Seisakusho, Kyoto, Japan

[21] Appl. No.: 181,664

[22] Filed: Aug. 26, 1980

[30] Foreign Application Priority Data

Aug. 28, 1979 [JP] Japan ............................ 54-118624[U]

[51] Int. Cl.³ ...................... H02H 3/00; H02H 7/122
[52] U.S. Cl. ...................................... 361/93; 361/100; 363/57
[58] Field of Search ...................... 361/93, 18, 54, 57, 361/100, 101; 363/55, 56, 57

[56] References Cited

U.S. PATENT DOCUMENTS 3,531,711  9/1970  Fusco ............................... 361/93 X
3,947,748  3/1976  Klein ................................... 363/57

Primary Examiner—Reinhard J. Eisenzopf
Attorney, Agent, or Firm—Koda and Androlia

[57] ABSTRACT

An overcurrent protection circuit of an inverter supplied with power through a switching regulator which has the basic features of the circuit constructed in such a manner that, when the input current of the inverter exceeds a set point, the circuit forcefully energizes conduction circuits of two systems including PUT or UJT through a pulse generation circuit (turn-on circuit) connected to the switching regulator and instantaneously shuts off the overcurrent of the inverter and a driving signal of the switching regulator.

3 Claims, 2 Drawing Figures

OVERCURRENT PROTECTION CIRCUIT FOR INVERTER

BACKGROUND OF THE INVENTION

1. Field of the Invention

This invention relates to an overcurrent protection circuit, and more particularly to a circuit for protecting the switching elements in an inverter (DC-AC power converter) against damage from an overcurrent by instantaneously breaking an input current and a driving signal of a switching regulator, when the input current of the inverter having the switching regulator exceeds a set point.

2. Prior Art

Heretofore, an inverter and a switching regulator driving the inverter are generally made up of semiconductor switching elements. Because electric resistance, when the elements are energized, is not zero, it is desirable to hold the applied voltage of the elements high in order to hold the efficiency of the inverter high. However, high-voltage switching elements are generally expensive, and it has to be equipped with means for preventing damages of the switching elements to maintain reliability of the apparatus. Up to now, an instantaneously breakable fuse and an instantaneous circuit breaker have been used. However, the fuse and breaker are slow to react upon overcurrent. More specifically, since the electro-static capacity of a capacitor connected to the switching regulator for supplying a current to the inverter is large, the switching elements in the inverter have been energized and damaged before the switching regulator was switched off. Also, because the overcurrent flows through the switching elements before the instantaneously breakable fuse and instantaneous circuit breaker functioned, there would occur degraded portions in the elements, with the result that the switching elements are rendered unable to function as properaly as they should.

SUMMARY OF THE INVENTION

Accordingly, it is the primary object of this invention to provide an overcurrent protection circuit which reacts instantaneously and effectively upon overcurrent.

In keeping with the principle of this invention, the object of this invention is accomplished by a unique structure for an overcurrent protection circuit having a switching regulator said circuit comprising a pulse generation circuit connected to said switching regulator and conduction circuits of two systems, said protection circuit being designed to instantaneously shut off the input current of said inverter and a driving signal of the switching regulator by generating a trigger pulse by said pulse generation circuit and energizing said conduction circuits of two systems by said pulse when the input current of the inverter exceeds a set point.

DETAILED DESCRIPTION OF THE INVENTION

A description will now be given in detail of the overcurrent protection circuit according to this invention with reference to an embodiment thereof shown by way of example in the accompanying drawings.

Figure 1:
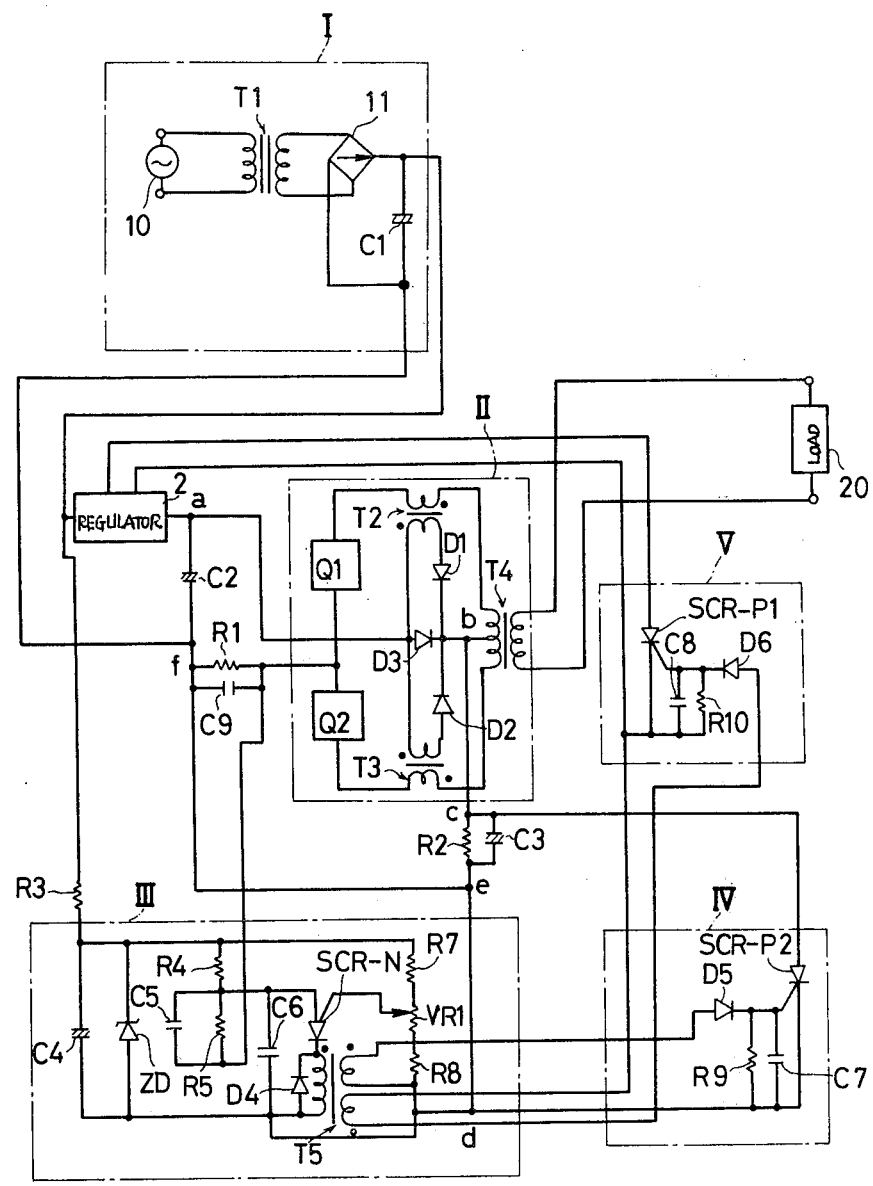
FIG. 1 is a block diagram showing an overcurrent protection circuit of an inverter of this invention.

Referring to FIG. 1, an input power circuit I comprises an AC power source 10, a power transformer T1, full-wave rectifying circuit 11 and a smoothing condenser C1 and supplies an inverter II with necessary power through a switching regulator 2 and a smoothing condenser C2. The inverter II includes two switching elements Q1 and Q2, current limiting transformers T2 and T3, and diodes D1, D2 and D3, and supplies AC power necessary for load 20 by push-pull operation of the switching elements Q1 and Q2. The detailed construction of the inverter is omitted, since it is disclosed in the earlier patent application filed by the present applicant in Japanese Patent Publication No. 24969/79 (filed on Mar. 2, 1979).

A pulse generation circuit III illustrated in the embodiment applies an N-gate thyristor SCR-N and is connected in parallel to the inverter II. Said pulse generation circuit III is constructed in such a manner that, when current exceeding a set point flows through the inverter II, namely when the voltage V6 across a condenser C6 exceeds the gate voltage VS of N-gate thyristor SCR-N determined by a variable resistor VR1, the N-gate thyristor SCR-N turns on and the pulse generation circuit III generates a trigger pulse through a pulse transformer T5 to energize thyristors SCR-P1 and SCR-P2 in conduction circuits IV and V. Incidentally, the characters C5 in the pulse generation circuit III designates a speed-up condenser adapted to expedite charging of a condenser C6 connected between the anode and the cathode of the N-gate thyristor SCR-N, and ZD designates a Zener diode adapted to hold a voltage to be applied to the N-gate thyristor SCR-N at a fixed value.

The conduction circuit IV includes an ordinary thyristor SCR-P2 and is energized by the trigger pulse generated by the pulse generation circuit III, and is adapted to prevent an overcurrent from flowing into the switching elements Q1 and Q2 by causing the input current of the inverter II supplied through the switching regulator 2 to flow through the diode D3 in the inverter II and through the switching element IV. When the input current of the inverter II exceeds a set point, the conduction circuit V energizes the thyristor SCR-P1, cuts the driving signal of the switching regulator 2 and disconnects the inverter II from the input power circuits I by the conduction circuit V inputting the trigger pulse generated by the pulse generation circuit III.

A description will now be given of how the overcurrent protection circuit of this invention functions when the input current of the inverter II exceeds a set point. When the input current of the inverter II is below the set point, the input power supplied by the input power circuit I is supplied to load 20 as an alternating current by the push-pull operation of the switching element Q1 and Q2, and the input current flowing through the switching elements Q1 and Q2 at this time is detected by a shunt resistor R1.

Figure 2:
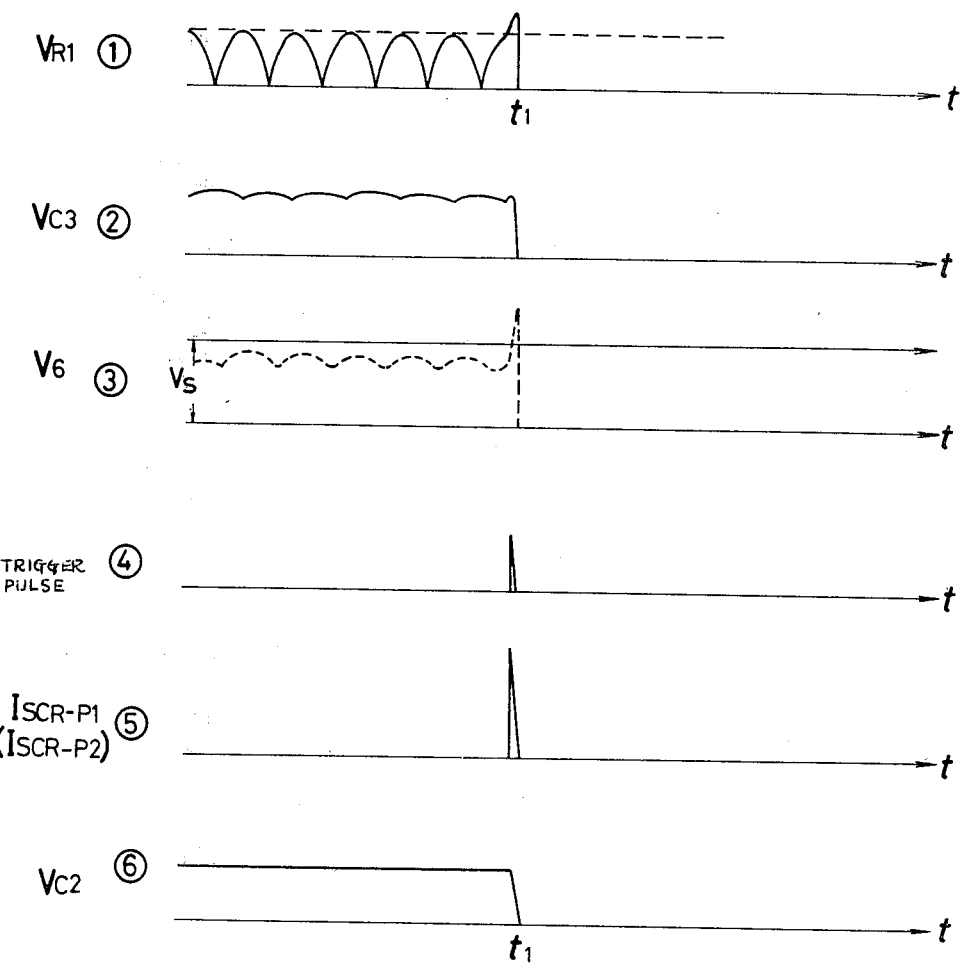
FIG. 2 is a timing chart showing the operating principle of the circuit.

When the input current of the inverter II exceeds a set point, namely when the current flowing through the switching elements Q1 and Q2 becomes suddenly excessive at t1 as shown in FIG. 2 ①, the voltage V6 across the N-gate thyristor SCR-N exceeds the voltage set by the N-gate, and the N-gate thyristor SCR-N becomes energized and generates a trigger pulse shown in FIG.

2 ④ through the pulse transformer T5, and energizes the thyristors SCR-P2 and SCR-P1 in the conduction circuits IV and V respectively by the trigger pulse to generate an anode current shown in FIG. 2 ⑤. Accordingly, it will be readily understood that a short-circuit pass which short-circuits the terminals of smoothing condenser C2 shown by a→D3→C→SCR-P2→d→e→f in FIG. 1 is formed by energization of SCR-P2 and shuts off the input current from flowing into the switching elements Q1 and Q2, shuts off a driving signal of the switching regulator 2 by energization of SCR-P1, and thereafter shuts off and separates the inverter II from the input power and protects the switching elements Q1 and Q2 of the inverter II against an overcurrent.

The description above has been given of the case wherein PUT (N-gate thyristor) is used as a pulse generation circuit but it should be understood that the same performance can be expected from the use of UJT. As described, this invention is highly useful for industrial application in that it has a conspicuous effect such as prevention of the damage and deterioration of the switching elements in the inverter which may by caused by the overcurrent due to a sudden increase in the load of the inverter.

I claim:

1. An overcurrent protection circuit for an inverter having a switching regulator, characterized in that said circuit comprises a pulse generation circuit connected to said switching regulator for generating a trigger pulse when an input current of said inverter exceeds a preset value, a first conduction circuit provided across said input current to said inverter and responsive to said trigger pulse from said pulse generation circuit to instantaneously shut off said input current to said inverter when said pulse generation circuit generates a trigger pulse and a second conduction circuit coupled to said switching regulator and responsive to said trigger pulse from said pulse generation circuit to instantaneously shut off a driving signal of said switching regulator when said pulse generation circuit generates a trigger pulse.

2. An overcurrent protection circuit according to claim 1, wherein said first and second conduction circuits each comprises an SCR respectively.

3. An overcurrent protection circuit according to claim 1, wherein said pulse generation circuit comprises PUT (N-gate thyristor) or UJT and generates a single trigger pulse only when the input current of the inverter exceeds a set point.

* * * * *